March 15, 1966  B. THOMPSON ET AL  3,240,803

PREPARATION OF BENZENECARBOXLIC ACID

Filed Aug. 14, 1961  2 Sheets-Sheet 1

Benjamin Thompson
Sandford D. Neely
INVENTORS

BY R. Frank Smith
Charles L. Good
ATTORNEYS

Benjamin Thompson
Sandford D. Neely
INVENTORS

3,240,803
PREPARATION OF BENZENECARBOXYLIC ACID
Benjamin Thompson and Sandford D. Neely, Kingsport, Tenn., assignors to Eastman Kodak Company, Rochester, N.Y., a corporation of New Jersey
Filed Aug. 14, 1961, Ser. No. 131,144
6 Claims. (Cl. 260—524)

This invention involves the preparation of terephthalic acid from p-xylenes. More particularly, it involves a continuous method from the one-step oxidation of xylenes to benzenedicarboxylic acids in increased yields of high purity.

It is known to oxidize disubstituted aromatics directly with air to toluic acids. See U.S. Patents Nos. 2,673,217 and 2,245,528. However, we have now discovered an improved process whereby disubstituted aromatics, particularly xylenes, can be oxidized substantially directly in one step in a continuous process to the corresponding dicarboxylic acid in a very high yield having a high purity and easily recoverable as dry product.

It is accordingly an object of this invention to provide a continuous method for oxidizing xylene to terephthalic acid and/or isophthalic acid. Another object is to provide a process and apparatus whereby terephthalic acid and/or isophthalic acid can be produced continuously in readily filterable form. Still another object is to provide a process and apparatus for the preparation of substantially pure terephthalic acid and/or isophthalic acid containing no toluic acids. A further object of this invention is to provide a continuous method for the substantially direct conversion of xylene to terephthalic acid and/or isophthalic acid and apparatus therefor. It is apparent that this invention also encompasses the conversion of orthoxylene to ortho-phthalic acid. Other objects will be apparent hereinafter.

In the broader aspects of our invention, we have found that by using a temperature of from about 80 to 150° C. and a cobalt and/or manganese catalyst activated in acetic acid with acetaldehyde, we can oxidize m- or p-xylene substantially directly to isophthalic or terephthalic acid containing substantially no intermediate impurities such as toluic acids. Without the coupling of the use of this catalyst and the raising of the temperature to this range, it is not possible to carry the oxidation in a continuous one-step process beyond the toluic acid stage to the formation of terephthalic acid.

Most advantageously, according to our invention, the oxidation column is used as a classification column. In this embodiment, the xylene and a substantial part of the acetaldehyde are fed at a point above the midsection of the column. Additional acetaldehyde and oxygen, advantageously in the form of air, are fed into the lower part of the column. A slurry of the acid product, e.g., terephthalic acid, is withdrawn from the base of the column and can be readily filtered.

Such a procedure causes the smaller crystals of isophthalic or terephthalic acid to be carried toward the top of the oxidation column acting as a classification column while the larger crystal aggregates settle to the bottom. Thus, the larger aggregates become readily separable in conventional equipment. This was a most surprising discovery. Also, the countercurrent flow of oxygen-containing gas and oxidizable material, i.e., p-xylene in this embodiment results in a substantially pure benzenedicarboxylic acid product whereby toluic acid in the product is substantially eliminated.

Another surprising advantage of the use of the oxidation column as a classification column is the resulting higher partial pressure of oxygen in the liquid contents with the consequent higher concentration of intermediate per-oxygen complexes at the base of the column keeping the xylene concentration relatively low and substantially completing the oxidation of any toluic acid in the slurry near the point of its removal.

In a more complex embodiment of this invention, using the same increased temperature range and the same catalyst, a plurality of oxidation column reactors can be used, for example, from 2 to 10, depending somewhat upon the size of the operation, each individual reactor column acting as a classification column and the total effect being that of a gradually increasing classification of the product particles to larger crystal aggregates as the slurry moves from the initial toward the final oxidation reactor column. The reactor columns are arranged in series in this embodiment. Since the maintenance of the cobalt catalyst (or manganese) in an active state depends upon the oxidation of acetaldehyde to acetic acid in the course of the conversion of xylene to benzenedicarboxylic acid, acetaldehyde is added to the second and/or further additional columns in series. A minor portion of the acetaldehyde may or may not be added to the first column since in a long series of such reactor columns the first one or two reactors may be used to oxidize xylene to intermediate toluic acid and this does not necessitate the presence of any catalyst, acetic acid, or acetaldehyde. The heat of reaction is removed by boiling off acetic acid and water from each column. These overheads may be condensed and refluxed to the oxidizers. No heat need be applied except at the start-up of the continuous operation.

The catalyst employed in this invention may be described as an aldehyde activated cobalt in solution. Such a solution may appropriately be prepared by dissolving a suitable catalytic metal in the form of one of its aliphatic acid-soluble oxides, salts or other compound in an aliphatic acid such as acetic, propionic or butyric acid. We prefer to use cobalt as the metal and acetic acid as the acid. However, manganese is also useful as well as iron, nickel, etc. The preferred group are Co and Mn compounds which are soluble in acetic acid.

As to pressure, the process of this invention may be operated in general at any pressure from atmospheric to as high as from 2 to 10 atmospheres. However, a pressure of from about 15 to 35 p.s.i.g. is preferred.

The process of our invention may also be used for the oxidation of all of the disubstituted aromatics substantially directly to the corresponding acids. For example, o-xylene, o-diisopropylbenzene, m-dipropylbenzene, p-diethylbenzene, etc., can be oxidized thereby to phthalic, isophthalic and terephthalic acid.

A further understanding of our invention will be gained by an examination of the following drawings, which are illustrative thereof.

Figure 1:
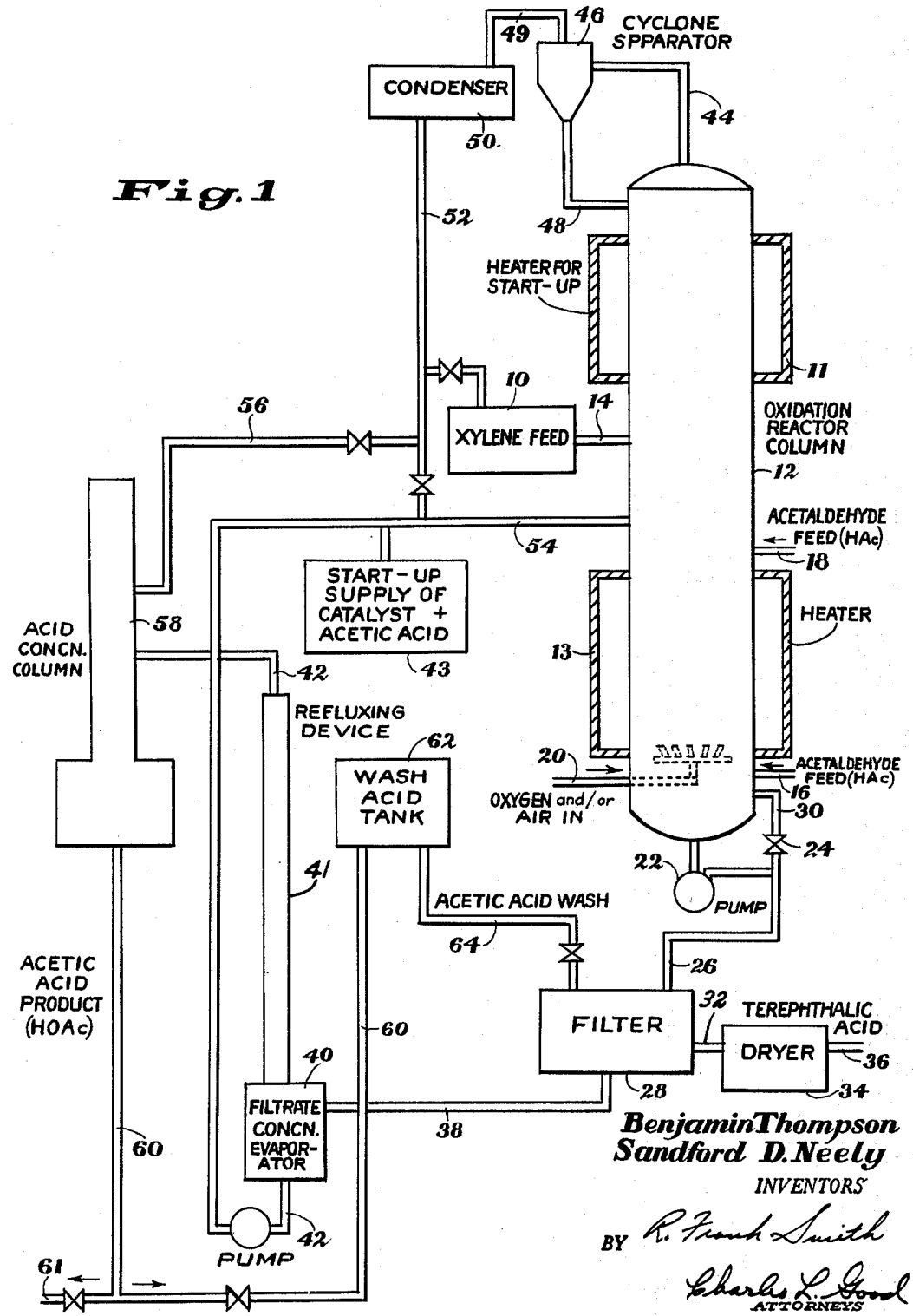
FIG. 1 is a schematic drawing in flow sheet form depicting a preferred embodiment of the present invention, including additional steps which may be used in relationship with the primary reaction in the reaction column.

Referring first to FIG. 1, para-xylene is introduced from feed tank 10 to oxidation reactor column 12 via line 14. A major proportion of acetaldehyde feed is introduced to said oxidation column 12 near the bottom thereof at line 16. A minor proportion of acetaldehyde feed may be introduced to said oxidation column 12 near the midportion thereof at line 18. Air and/or oxygen is introduced at the bottom of the oxidation column through line 20. Terephthalic acid slurry is conducted from the oxidation column 12 by line 22, valve 24 and line 26 to a rotary filter 28. Part of the terephthalic acid slurry may be fed back into the oxidation column 12 through line 30. Oxidation column 12 is equipped with heating means 11 and 13 solely for start-up operations; these can be internal or external and of any conventional type as in U.S. Patent No. 2,673,217. Oxidation column 12 is essentially a long hollow vertical chamber designed to provide a liquid height at least 10 times its diameter based on its circular cross section.

After passing through line 32, the terephthalic acid is dried in dryer 34, from which it is removed as a substantially dry product at line 36. The filtrate from rotary filter 28 is conducted through conduit 38 to a filtrate evaporator 40 and refluxing condenser 41. The concentrated solution containing catalyst is returned by a line 42 to the oxidation column 12. A catalyst storage vessel 43 is provided for the initial supply of catalyst to line 54. The off-gas from the oxidation column 12 passes via line 44 to an entrainment cyclone 46 from which the bottoms may be returned to oxidation column 12 via line 48. The off-gas goes via line 49 to a condenser 50 where most of the acetic acid vapors are condensed. Part of the condensed acid can be returned to the oxidation column by lines 52 and 54 and part sent via line 56 to an acid concentration still 58 in which lower boilers are removed. The concentrated acetic acid in excess of that needed is removed through line 61. Part of the acetic acid is returned by line 60 to a wash acid tank 62 and is usually about 75 to 100% acetic acid with the remainder being water, preferably 85–100% acetic acid. From this tank it is conducted to rotary filter 28 via line 64. The washing operation helps remove residual toluic acid from the filter cake. The off-gas from the condenser 50 may be scrubbed and the weak acid then sent to an acetic acid and xylene recovery system which is not shown.

Figure 2:
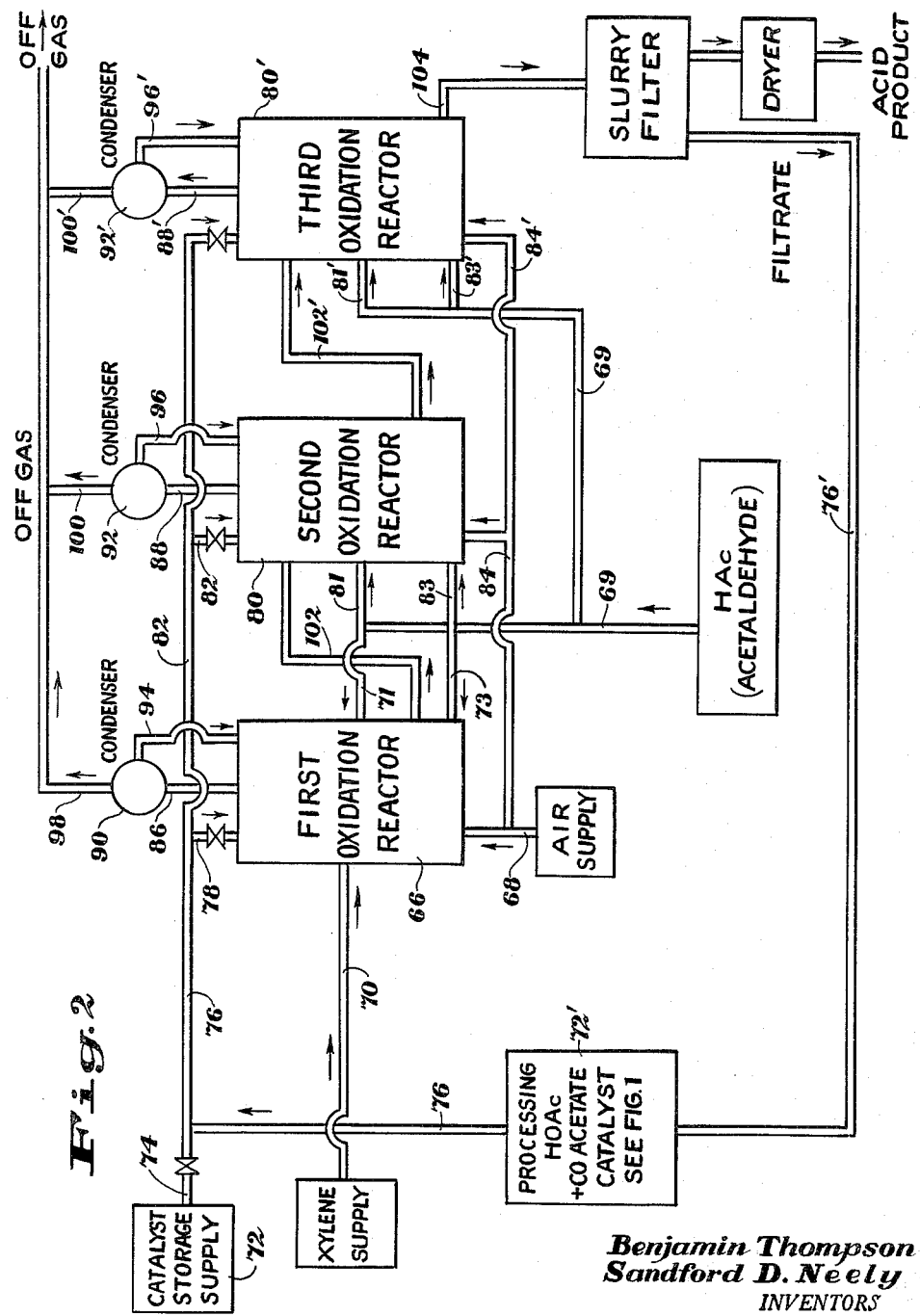
FIG. 2 is a schematic representation of an alternative embodiment of the invention wherein a plurality of reactors is used.

Referring now to FIG. 2, air and/or oxygen and xylene are introduced separately to first oxidation reactor 66 by means of lines 68 and 70, respectively. Catalyst may be introduced to the top of the reactor from storage tank 72 through lines 74, 76 and 78, some of the catalyst being carried on to a second oxidation reactor 80 through line 82. Additional air is introduced to the second reactor 80 through line 84. Acetaldehyde may be fed into the reactors via lines 69, 71, 73, 81 and 83 as needed. Off-gas leaves reactors 66 and 80 via lines 86 and 88, respectively. Condensables in the off-gas may be condensed in condensers 90 and 92 and recycled via lines 94 and 96, respectively to said reactors. The off-gas leaving the condensers 90 and 92 via lines 98 and 100 may be scrubbed and recovered materials returned for reuse in the reactors. Partially oxidized xylene passes from the lower part of first reactor 66 to the upper region of second reactor 80 via line 102. Additional reactors may be used, as indicated by the third oxidation reactor shown in FIG. 2 wherein the parts are numbered using a prime mark to show their equivalent functions.

We have found that the greater the height to diameter ratio the greater the purity of the terephthalic acid produced and the greater the productivity. From 2 to 6 reactors in series usually give us the desired overall height to diameter ratio without the necessity of an excessively high tower or column. More or less reactors can be used depending upon the desired purity and productivity. The terephthalic acid product is withdrawn from final reactor such as reactor 80 or 80' via line 104 and may be filtered and recovered in a manner similar to that indicated in FIG. 1. The filtrate may also be recovered and purified as indicated in FIG. 1.

This invention can be further illustrated by the following examples of preferred embodiments although it will be understood that these examples are included merely for purposes of illustration and are not intended to limit the scope of the invention unless otherwise specifically indicated.

*Example I*

An oxidation tower such as that depicted in FIG. 1 was filled with a catalyst solution which comprised about 3% cobalt acetate in acetic acid. Air was turned on and acetaldehyde feed started at the base. After a period of 1 to 2 hours, the temperature rose rapidly to 50° C. as the catalyst assumed an active form. The temperature of the tower was allowed to increase to about 120° C. and the off-gas pressure was adjusted to about 30 p.s.i.g. to maintain this temperature. With the catalyst in an active state, p-xylene feed was started into the midsection of the tower. Additional acetaldehyde was fed into the midsection of the tower as needed to maintain the reaction. As the oxidation proceeded, solid terephthalic acid was formed. The larger particles of terephthalic acid descended to the base of the column against the rising flow of gas. When the concentration of the terephthalic slurry had increased to 10–20% by weight of solids, the slurry was continuously withdrawn from the lower part of the reactor to a rotary filter. The average particle size of the terephthalic acid was 2 microns. The terephthalic acid was washed on the filter with acetic acid to remove the cobalt catalyst and any toluic acid present. From the filter the terephthalic acid passed to drying and packaging equipment. The filtrate, catalyst solution and wash acid entered an evaporator in which it was concentrated to original strength (maximum of 20% water) and returned to the oxidation column. The temperature of reaction was maintained at about 120° C. and the pressure at about 30 p.s.i.g. However, the pressure and temperature may be varied according to the desired rate of reaction and purity of the terephthalic acid product desired. For successful operation the temperature should be greater than about 80° C. and not more than about 150° C. and the pressure from about atmospheric to about 125 p.s.i.g. In this example the acetaldehyde to xylene molar feed ratio was about 2 to 1. However, this ratio may be varied from about 1–10 or more to 1. The concentration of the slurry taken off can be 5 to 30% or more and the concentration of water in the acetic acid catalyst solution can be varied from about 0 to a maximum of about 20%. The quantity of wash acid used can be varied from about 5–30 pounds per pound of acid product over the period of operation, which in this example was about 6 hours. The amount of xylene fed to the reactor was 0.7 lb./lb. TPA produced; the amount of acetaldehyde fed was 0.5 lb./lb. TPA produced; and the amount of air was 45.5 s.c.f./lb. TPA produced. Terephthalic acid (TPA) containing less than 0.4% toluic acid was obtained. This purity is easily obtained; however, more rapid operation can be performed and still keep the toluic acid content well below 1%.

A reactor similar to that of Example I was operated with conditions and amounts of materials used being the same except for the xylene, air and acetaldehyde being fed into the base of the oxidation tower and with the slurry being removed from the upper section, in this case co-current operation was used. The average particle size of the terephthalic acid product was less than 0.5 micron (relatively difficult to filter) as compared to an average particle size of over 2 microns in Example I where countercurrent flow was maintained. Moreover, the percentage of oxidation and purity of product were substantially less.

*Example II*

Xylene was oxidized to substantially pure terephthalic acid in a plurality of three oxidation reactors in series, such as those shown in FIG. 2. The active state of the cobalt catalyst was maintained by simultaneous oxidation of acetaldehyde to acetic acid in the second and third reactors. A pressure of about 30 p.s.i.g. was maintained in the reactors, and a temperature of from 120 to 130° C. The off-gas was directed to a scrubber where residual acetic acid was removed by water scrubbing. The overflow from the final oxidizer was directed to a rotary vacuum filter where the terephthalic acid was recovered from the mother liquor. After washing, the terephthalic acid product was dried in a trough dryer, cooled, and conveyed to storage. The flow of cobalt catalyst in acetic acid entering into the first and second reactors to which introduced was a total of 20 lb./lb. TPA produced. The amount of air introduced to each of three reactors was 14.15 s.c.f./lb. TPA. The amount of xylene fed to the first reactor was 0.67 lb./lb. TPA produced; 0.55 lb. HAc/lb. TPA was fed to the second and third reactors.

*Example III*

A series of four or more reactors similar to those of Example II were operated with conditions and amounts of materials used the same except no acetic acid nor catalyst was fed to the first two oxidation reactors. The p-xylene was thereby partially oxidized to toluic acid and flowed to the remaining reactors where in the presence of the acetaldehyde-activated catalyst solution it was completely oxidized. Acetic acid and catalyst plus acetaldehyde were fed into the third reactor in series. Acetaldehyde was fed into the remaining reactors in the series. However, acetic acid and catalyst need not be fed into all of these subsequent reactors and can be advantageously fed only to two or three reactors in the middle of the series.

From the preceding description and examples it can readily be seen that we have provided a novel method for the preparation of substantially pure terephthalic acid from xylene in basically one step. Terephthalic acid produced in accordance with this invention is highly useful in preparation of polyesters for fibers, esterification processes and the like.

The more detailed description provided above can be employed in more general terms as follows for accomplishing the objectives of this invention. Thus, the invention provides a process for the continuous preparation of a benzene dicarboxylic acid in a vertically elongated overall reaction zone having an overall length to diameter ratio of at least 10 to 1, said overall zone consisting of from one to ten zonal increments, which process comprises (1) introducing at a point above the midpoint of said overall zone a member selected from the group consisting of a meta xylene and para xylene, said overall zone containing in at least the last 50% of its length a solution of from about 0.5 to 8% of a metal selected from the group consisting of cobalt and manganese dissolved in acetic acid, the percentage being based on the weight of acetic acid, the contents of said overall zone being maintained at a temperature from about 80° C. to about 150° C., (2) introducing acetaldehyde into said overall zone where it contains said metal, the number of moles of acetaldehyde per mole of xylene being introduced into said overall zone being from about 1 to about 10, (3) introducing into said overall zone an oxygen-containing gas whereby said gas moves vertically throughout substantially the entire length of said overall zone, the total amount of said gas being introduced at all points being at least 3 moles of $O_2$ per mole of xylene, (4) conducting the lowermost contents of any zonal increment preceding the last zonal increment to the upper region of the next zonal increment and (5) withdrawing the lowermost contents of the final zonal increment as a slurry of benzenedicarboxylic acid particles containing no more than about 5% by weight based on the weight of the benzenedicarboxylic acid of occluded toluic acid.

Quite obviously, the final zonal increment (also called a sub-zone) can be the only zonal increment, in which case only a single reactor is employed.

More particularly, this process can be performed wherein the liquid contents in the overall zone are maintained under a pressure of off-gas whereby the vaporization of liquid constituents serves as the principal means for maintaining the temperature of the liquid contents and the amount of water based on the weight of acetic acid in the liquid contents is no more than about 20%.

In another particular embodiment of this invention this process can be performed wherein the oxygen-containing gas is fed at a rate whereby the percentage of oxygen in the off-gas is from 0 to 10% and the vertical rise of said gas moving against the downward flow of liquid contents provides a distribution of solid particles of benzenedicarboxylic acid in the liquid contents of the zone such that particles having an average diameter of less than about one micron are primarily kept in suspension and a substantial proportion of particles having an average diameter of over one micron settle to the lower part, whereby the slurry of particles being removed contains readily filterable particles.

Another particular embodiment of this process can be performed wherein the oxygen-containing gas is air and the amount of air being fed is no more than about 100 standard cubic feet per pound of benzenedicarboxylic acid being removed in the slurry.

Another particular embodiment of this process can be performed wherein the overall length to diameter ratio is from 30 to 1 up to 500 to 1.

Another particular embodiment of this process can be performed wherein the major proportion of acetaldehyde is fed into a lowermost region of the overall zone whereby the amount of occluded toluic acid in the particles of benzenedicarboxylic acid is less than 1%.

Another particular embodiment of this process can be performed wherein the pressure in the overall zone is from about zero to about 125 pounds per square inch gauge pressure.

Another particular embodiment of this process can be performed wherein step (5) comprises continuously withdrawing a slurry of said benzenedicarboxylic acid, filtering said acid slurry, washing with concentrated acetic acid so as to remove substantially all of said catalyst and toluic acid, and drying the benzenedicarboxylic acid product.

According to a preferred embodiment of this process p-xylene is introduced in step (1) and terephthalic acid is produced.

Another particular embodiment of this process can be performed wherein m-xylene is introduced in step (1) and isophthalic acid is produced.

As already explained above, a preferred embodiment of this process can be performed wherein the overall zone is subdivided into a plurality of zonal increments or sub-zones which taken together are employed to carry out the process defined above, whereby the xylene is fed to the first zonal increment or sub-zone, the solution of metal in acetic acid is in at least the last 50% of the length of the overall reaction zone, acetaldehyde is introduced into at least the last sub-zone, the liquid contents of each sub-zone is conducted from the lower portion thereof to the upper portion of the next sub-zone in the series, and said slurry of step (4) defined above is removed from the bottom of the lower part of the last one of the sub-zones in the series.

In another particular this process can be performed wherein acetaldehyde is introduced into at least two sub-zones which contain metal in acetic acid.

In another particular this process can be performed which is carried out in from 3 to 10 sub-zones.

As explained in greater detail above, this invention also provides apparatus for the oxidation of xylene to a benzenedicarboxylic acid which comprises an elongated vertical chamber, means for feeding xylene into the midsection, means for feeding an oxygen-containing gas vertically throughout said chamber, means for removing a slurry from a lower portion thereof, means for removing off-gas from the upper portion thereof, means for feeding into said chamber a solution of a metal selected from the group consisting of cobalt and manganese dissolved in acetic acid, means for feeding acetaldehyde into said chamber below the point where said solution of metal is fed and at least in the lower portion of said chamber, filtering means for separating said benzenedicarboxylic acid particles in said slurry from liquid containing said solution of metal in acetic acid, means for removing water from said liquid containing said metal dissolved in acetic acid, means for recycling said metal dissolved in acetic acid to said chamber, said apparatus being adapted to produce a benzenedicarboxylic acid containing no more than 5% by weight of toluic acid.

The invention has been described in detail with particular reference to preferred embodiments thereof, but it will be understood that variations and modifications can be effected within the spirit and scope of the invention as described hereinabove and as defined in the appended claims.

We claim:

1. A process for the continuous preparation of particles of a benzenedicarboxylic acid which comprises the following steps:
   (1) continuously introducing in an intermediate portion of the overall length of a vertically elongated overall reaction zone a member selected from the group consisting of a meta-xylene and para-xylene, said overall zone containing in at least a lower portion of its length a soluble salt of a metal selected from the group consisting of cobalt and manganese dissolved in acetic acid, the contents of said overall zone being maintained at a temperature from about 80° C. to about 150° C.,
   (2) continuously introducing acetaldehyde into said overall zone where it contains said metal, the number of moles of acetaldehyde per mole of xylene being introduced into said overall zone being from about 1 to about 10, there being a sufficient proportion of said acetaldehyde fed into a lower portion of said overall zone whereby particles of benzenedicarboxylic acid in the lowermost contents thereof contain no more than about 5% by weight of occluded toluic acid,
   (3) continuously introducing into a lower portion of said overall zone an oxygen-containing gas whereby said gas moves vertically throughout that region of said overall zone wherein particles of a benzenedicarboxylic acid are formed by oxidation of said xylene, the total amount of said gas being introduced being at least sufficient to provide 3 moles of oxygen per mole of xylene and so that particles of benzenedicarboxylic acid having an average diameter of less than about 1 micron are kept in suspension by the vertical rise of said gas while allowing a substantial proportion of larger particles to settle downwardly, and
   (4) continuously withdrawing a slurry of said downwardly settled larger particles of benzenedicarboxylic acid.

2. A process as defined by claim 1 wherein the xylene is introduced at a point near the midpoint of said overall zone and a sufficient proportion of acetaldehyde is fed into a lower portion of said overall reaction zone whereby said larger particles contain no more than about 1% of occluded toluic acid.

3. A process as defined by claim 1 wherein said overall reaction zone is subdivided into a series of interconnected zonal increments and substantially all of the xylene is fed into the initial zonal increment.

4. A process as defined by claim 3 wherein the xylene is para-xylene whereby the benzenedicarboxylic acid is terephthalic acid.

5. A process as defined by claim 1 wherein the xylene is para-xylene whereby the benzenedicarboxylic acid is terephthalic acid.

6. A process as defined by claim 1 wherein the xylene is meta-xylene whereby the benzenedicarboxylic acid is isophthalic acid.

References Cited by the Examiner
UNITED STATES PATENTS

| | | | |
|---|---|---|---|
| 1,902,550 | 3/1933 | Forrest et al. | 260—524 |
| 2,245,528 | 6/1941 | Loder | 260—524 |
| 2,479,067 | 8/1949 | Gresham | 260—524 |
| 2,547,684 | 4/1951 | Bourdon | 23—263 |
| 2,673,217 | 3/1954 | Hull | 260—524 |
| 2,723,994 | 11/1955 | Haefele et al. | 260—524 |
| 2,794,832 | 6/1957 | Rietema | 260—525 |
| 2,837,584 | 6/1958 | Hoff | 260—674 |
| 2,839,575 | 6/1958 | Fetterly | 260—524 |
| 2,848,483 | 8/1958 | Reif et al. | 260—674 |
| 2,890,245 | 6/1959 | Bonnet | 260—524 |
| 2,926,074 | 2/1960 | Berger | 23—263 |
| 2,962,361 | 11/1960 | Spiller et al. | 23—260 |

FOREIGN PATENTS 698,157  10/1952  Great Britain.

LORRAINE A. WEINBERGER, *Primary Examiner.*

LEON ZITVER, *Examiner.*